United States Patent [19]

Young

[11] Patent Number: 5,005,908
[45] Date of Patent: Apr. 9, 1991

[54] FLOATING WEDGE COUPLING

[75] Inventor: Charles D. Young, Princeton, Ky.

[73] Assignee: Hoover Universal, Inc., Plymouth, Mich.

[21] Appl. No.: 422,005

[22] Filed: Oct. 16, 1989

[51] Int. Cl.$^5$ .............................................. A47C 7/00
[52] U.S. Cl. ................................... 297/443; 24/653; 297/452
[58] Field of Search ...................... 297/443, 452, 444; 24/582, 583, 635, 640, 642, 651, 652, 653, 656, 677

[56] References Cited

U.S. PATENT DOCUMENTS

| 503,043 | 8/1893 | Good | 24/653 X |
| 3,230,594 | 1/1966 | Smith | 24/653 |
| 3,332,117 | 7/1967 | McCarthy | 24/585 X |
| 3,908,243 | 9/1975 | Lou et al. | 24/653 |
| 3,989,298 | 11/1976 | Cycowicz et al. | 297/443 X |
| 4,890,888 | 1/1990 | Kostin | 297/443 |

FOREIGN PATENT DOCUMENTS 957474 5/1964 United Kingdom ................. 24/653

Primary Examiner—Laurie K. Cranmer
Attorney, Agent, or Firm—Harness, Dickey & Pierce

[57] ABSTRACT

A coupling for attaching a seat back to a seat cushion particularly for an automotive seat assembly in which the coupling includes a tapered plate member extending upwardly from the rear of the seat cushion and a housing attached to the frame of the seat back into which the plate member is inserted by moving the seat back down onto the seat cushion. A spring biased wedge is disposed within the housing and biases the plate member toward one side of the housing. When the plate member is fully inserted into the housing, one sidewall of the housing is seated into a recess in the edge of the plate member and held in place by the wedge. Once the sidewall housing is seated in the plate member recess, movement of the housing relative to the plate member is prevented. The seat back is removable for servicing by moving the wedge out of its position holding the plate member in place so as to enable the housing sidewall to be withdrawn from the plate member recess to enable separation of the housing and plate member.

4 Claims, 3 Drawing Sheets

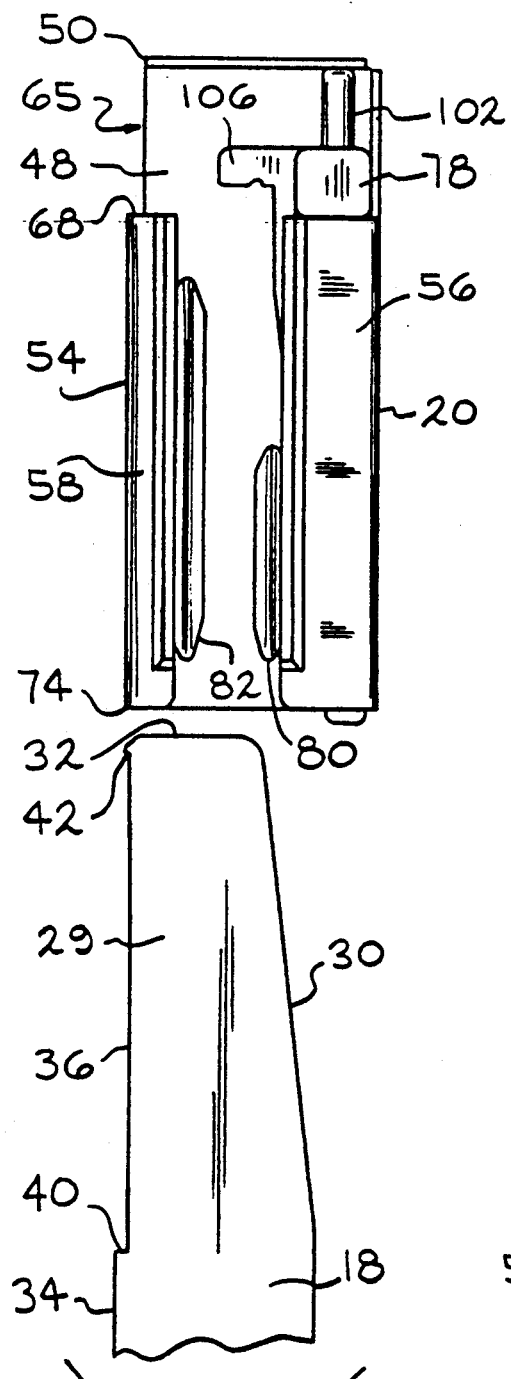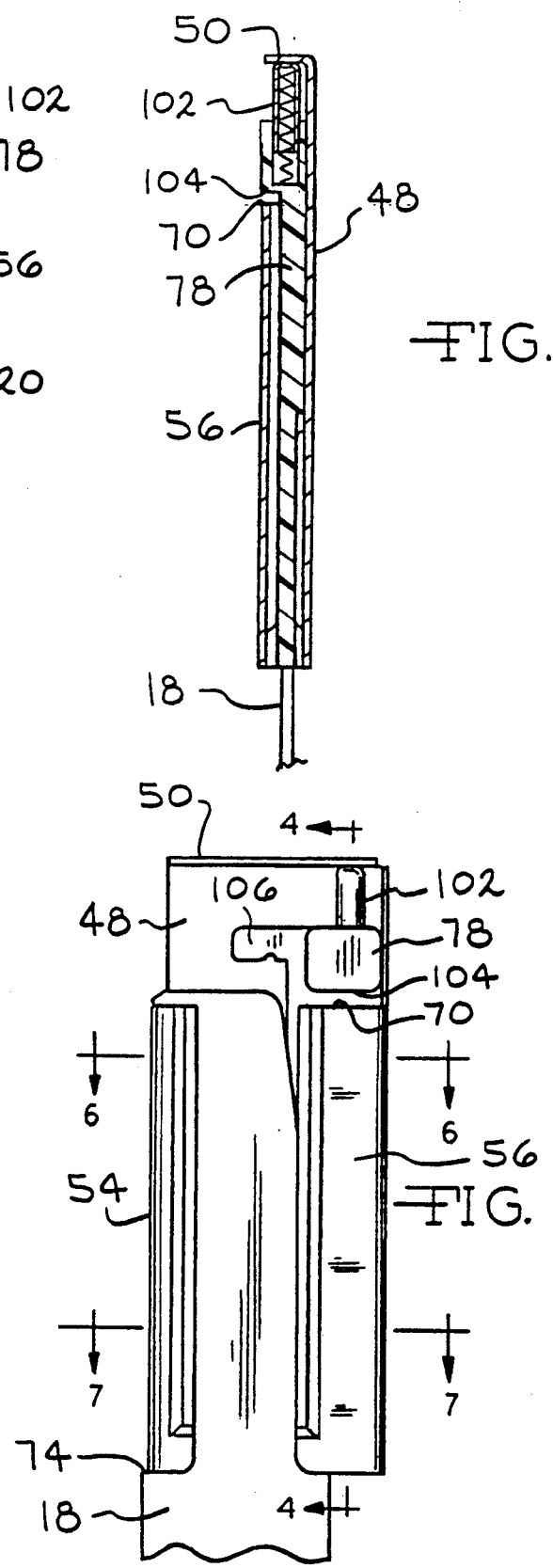

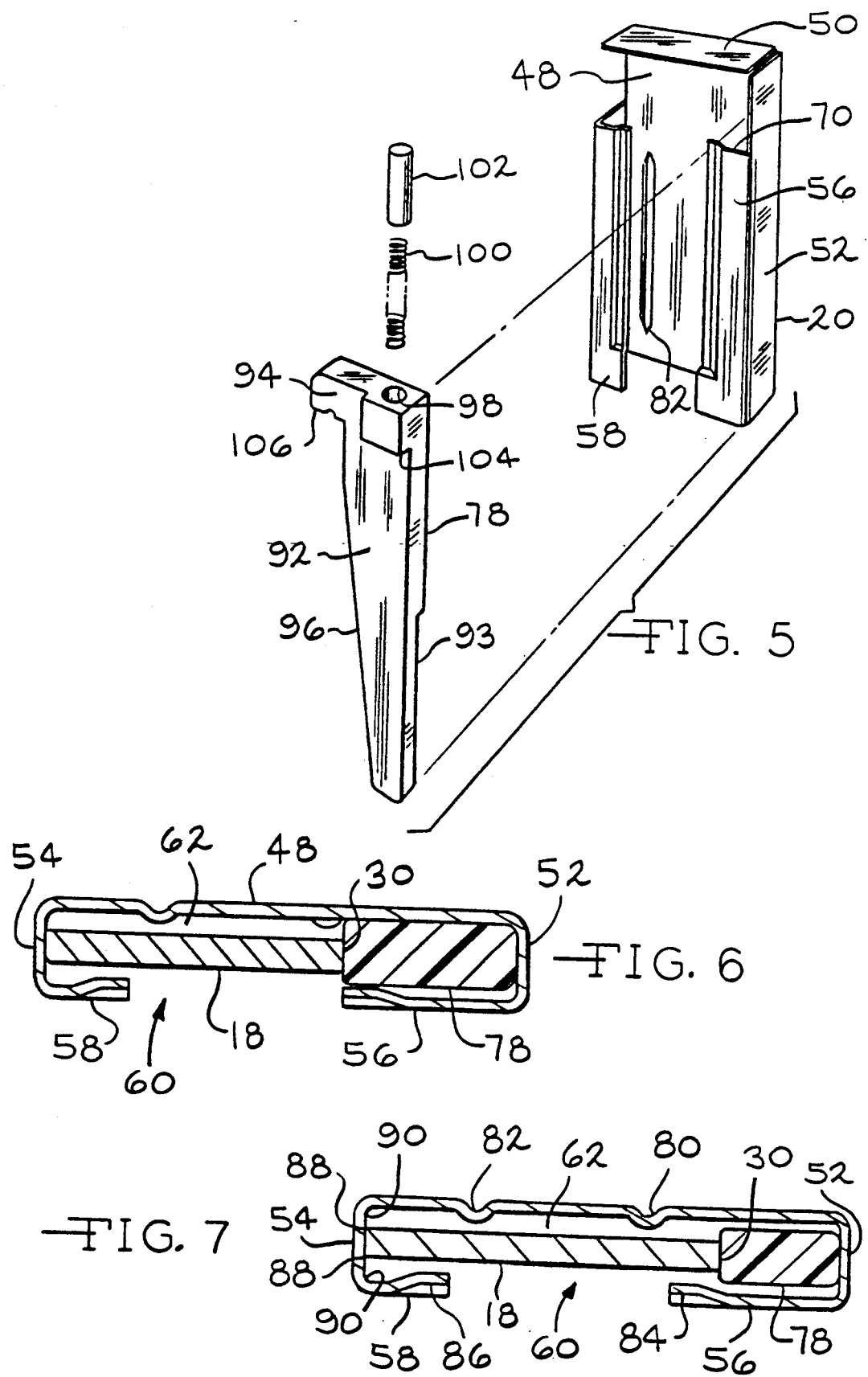

FLOATING WEDGE COUPLING

BACKGROUND AND SUMMARY OF THE INVENTION

This invention relates to a coupling for joining two bodies together and more particularly to a coupling for joining a seat back to a seat cushion.

An automotive seat assembly typically consists of a lower, generally horizontal, seat cushion and a seat back extending upwardly from the rear of the seat cushion. To reduce the size of shipping containers, the seat back is often shipped disassembled from the seat cushion. During assembly of an automobile, the seat cushion is installed in the vehicle body and the seat back is attached to the seat cushion at a later point in the assembly process.

The attachment of the seat back to the seat cushion has generally required one or more fasteners such as nut and bolt assemblies. Once assembled, an upholstery cover or trim member may be required to cover the fastener and provide a finished appearance. The above steps of attaching the seat back are both time consuming and labor intensive during the assembly process.

Accordingly, it is an object of the present invention to provide a simple coupling for the seat back which requires no separate attaching hardware to reduce the vehicle assembly time. The coupling of the present invention includes a plate mounting member extending upwardly from the seat cushion and a housing attached to the seat back which is open at its lower end to enable the housing to be slid over the plate member. The plate member and housing are configured so that when the plate member is fully inserted into the housing, one sidewall of the housing is seated into a recess in the plate members prevent withdrawal of the plate member from the housing. A wedge within the housing forces the housing sidewall into the recess. In a typical seat assembly, a coupling is provided at each lateral side of the seat assembly. The plate members extending upward from the seat cushion can be rotatably mounted to the cushion to enable the angle of the seat back to be varied.

The seat back is mounted to the seat cushion by sliding the seat back downward onto the plate members until the plate members have been fully inserted into the housings. Once fully inserted, the wedge in each housing forces the plate members to move laterally relative to the housings to seat a sidewall of the housing into the recess in the plate members. If removal of the seat back is necessary to service the vehicle, the wedges can be raised to free the plate members, allowing the plate members to move laterally to unseat the housing sidewalls from the recesses to enable removal of the seat back.

In addition to reducing assembly time, the coupling has the advantage that the seat back can be fully trimmed with only a pair of slots on its lower side for reception of the plate members. These slots, being on the lower edge of the seat back, are not visible when the seat is assembled. It is a further advantage of the coupling that as a result of its simple assembly, there is little chance for the coupling to be improperly assembled. Furthermore, when the coupling is assembled, an audible "snap" will indicate that it has been fully assembled.

Further objects, features and advantages of the invention will become apparent from a consideration of the following description and the appended claims when taken in connection with the accompanying drawings.

BRIEF DESCRIPTION OF THE DRAWINGS

FIG. 2 is a side elevation view of the coupling in a disassembled position;

FIG. 3 is a side elevational view of the coupling in the assembled position;

FIG. 4 is a sectional view of the housing and wedge as seen from substantially the line 4—4 of FIG. 3;

FIG. 5 is an exploded perspective view of the housing and wedge of the coupling;

FIG. 6 is a sectional view of the assembled coupling as seen from substantially the line 6—6 of FIG. 3; and FIG. 7 is a sectional view of the assembled coupling as seen from substantially the line 7—7 of FIG. 3.

DETAILED DESCRIPTION OF THE PREFERRED EMBODIMENT

Figure 1:
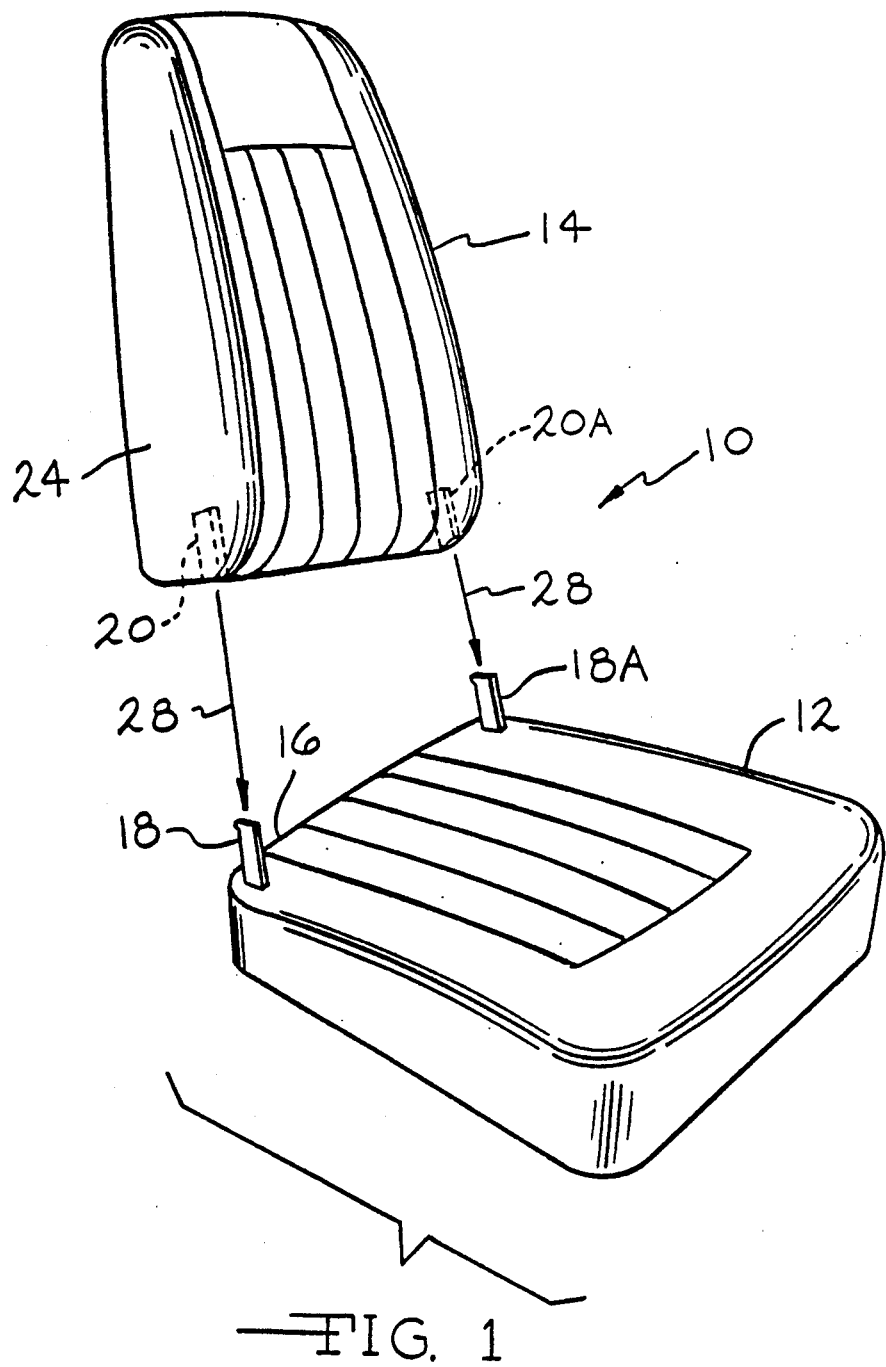
FIG. 1 is an exploded perspective view of a vehicle seat assembly containing the coupling of the present invention.

The exploded seat assembly 10 of FIG. 1 includes a pair of seat back couplings according to the present invention at the rear corners of the seat cushion to attach the seat back to the cushion. Seat assembly 10 includes a lower seat cushion 12 and a seat back 14. In the assembled position, seat back 14 is attached to seat cushion 12 and extends generally upwardly from rear portion 16 of the seat cushion.

The seat back coupling of this invention includes plate members 18, 18A attached to each side of seat cushion 12 and extending upwardly from the seat cushion. Seat back 14 includes a pair of coupling housings 20, 20A which are attached to the seat back frame (not show). The lower ends of the housings are open and seat back upholstery cover 24 includes slots over the open lower ends of the housings to enable plates 18, 18A to be inserted in the housings. To mount seat back 14 onto seat cushion 12, the seat back is pushed downward in the direction of arrows 28 to insert the plate members into the housings.

FIG. 2 shows the coupling in a disassembled relation. The upper portion 29 of plate 18 includes inclined edge 30 so that plate 18 tapers toward its upper terminal end 32. Edge 34 of plate member 18, opposite inclined edge 30, includes a recess 36. The recess 36 is formed by two laterally extending wall portions 40 and 42 opposing one another.

Housing 20 is preferably made from a single piece of stamped sheet metal. Housing back wall 48 extends the entire length of housing 20 and is bent over at its upper end to form housing top wall 50. Sidewalls 52, 54 are formed by bending portions of back wall 48 forward to right angles with back wall 48. A housing front wall is in turn formed by bending portions of the sidewalls at right angles to the sidewalls as shown by flanges 56, 58. Flanges 56, 58 are spaced from one another to create a slot 60 in the front wall.

The back, side and front walls of housing 20 define a hollow interior 62. Housing 20 is open at its lower end 64 for reception of a plate member 18 therein as shown in FIG. 3 and described in detail below. Sidewall 54 and front wall flanges 56 and 58 extend longitudinally from housing open end 64 toward top wall 50 but terminate short of top wall 50 to leave an opening 65 in the housing upper end.

The coupling is assembled by sliding the housing over plate member 18 to insert plate member 18 into interior 62 of housing 20. When the plate member has been fully inserted into housing 20, the plate member is moved laterally relative to the housing to seat sidewall 54 into recess 36 in plate member edge 34. Sidewall 54 is captured between laterally extending walls 40 and 42 with upper end 68 of sidewall 54 engaging plate wall 42 and the lower end 74 of sidewall 54 engaging plate wall 40. In this position, longitudinal movement of housing 20 relative to plate 18 is prevented.

A wedge 78 is slidably disposed within housing interior 62 to maintain housing 20 in the coupled position in which sidewall 54 is seated in recess 62. In the assembled position shown in lateral cross section in FIGS. 4 and 5, wedge 78 is positioned between the inclined edge 30 of plate 18 and housing sidewall 52 to maintain the engagement of housing sidewall 54 in recess 36.

Back wall 48 of housing 20 includes a pair of inwardly projecting ribs 80 and 82 while front wall flanges 56 and 58 include longitudinal indentations 84 and 86 along their terminal edges. The ribs and indentations serve to keep plate member 18 spaced from back wall 48 and flanges 56, 58 so that the relatively sharp corners 88 of plate 18 are not seated into the rounded corners 90 of housing 20 where line contact between the plate and housing would occur. If plate corners 88 were seated in housing corners 90, housing sidewall 54 would not properly seat into recess 36. The ribs and indentations also serve to stiffen housing 20.

Wedge 78 includes a main body portion 92 and an upper handle portion 94. Main body portion 92 tapers toward open lower end 64 of housing 20 and has an inclined edge 96 which is inclined complementary to inclined edge 30 of plate member 18. The wedge is positioned in the housing such that main body portion 92 is disposed between front wall flange 56 and back wall 48 while handle portion 94 is positioned above the upper end of flange 56 to be exposed through opening 65. Wedge 78 is inserted into housing 20 by pressing the wedge body portion between rib 80 and indentation 84. The lower end 93 of wedge 78 is of a decreased thickness shown by step 95 to provide clearance between the wedge and rib 80 in housing back wall 48.

The top of wedge handle portion 94 includes a longitudinal aperture 98 into which is inserted a spring 100 that extends upward from the wedge. The extending portion of the spring is covered by a cap 102 which is partially inserted into the wedge. Cap 102 prevents buckling of the extending portion of spring 100. The spring engages the inner surface of housing top wall 50 to bias wedge member 78 in a downward direction toward housing open end 64. Wedge handle portion 94 includes an outwardly extending ledge 104 that faces downward, toward upper end 70 of front wall flange 56. Ledge 104 engages flange upper end 70 to serve as a stop for wedge 78 to hold wedge 78 in place in opposition to biasing spring 100.

To assembly seat back 14 onto cushion 12, the seat back is lowered onto the cushion so as to insert plate member 18 into housing 20. When the inclined edge 30 of plate 18 contacts inclined edge 96 of wedge 78, the plate will push wedge member 78 upward, in opposition to biasing spring 100. During assembly, the wedge will force plate 18 laterally into engagement with sidewall 54. When plate 18 has been fully inserted into the housing, the wedge will force plate 18 laterally to seat sidewall 54 into recess 36. Once in this position, biasing spring 100 will urge the wedge downward so that the inclined edge of the wedge maintains engagement with the inclined edge of the plate. The wedge thus holds the housing in position where sidewall 54 is seated in recess 36. In the assembled position, the weight of the seat back is supported on the wall 40 at the lower end of recess 36.

During assembly, when the plate has been fully inserted, the wedge will cause the housing sidewall to snap into place in the plate recess. The sound of the sidewall snapping into place provides an audible signal to the vehicle assembler that the seat back has been properly installed.

The wedge is preferably molded of plastic. Due to its complex shape, including aperture 98, the wedge can be molded of plastic more economically than it can be machined from metal. Additionally, a plastic wedge will make little, if any, noise if it is not perfectly fit and is allowed to vibrate within housing 20.

As can been seen from the above description, assembly of the seat only requires that the seat back be slid over the plate members 18. This is simpler than many previous seat assemblies that require the seat back to be attached to the seat cushion with a number of fasteners and then require a trim cover to be positioned over the fasteners. As a result, with the coupling of this invention, assembly time is reduced, reducing the labor required to assembly a vehicle and improving the assembly efficiency.

The seat back can be removed from the seat cushion if necessary for servicing by inserting a tool between the upper end of plate 18 and the extending lever 106 of wedge handle portion 94 to raise the wedge member in opposition to spring 100. Once raised, the housing and plate member can be separated from one another by first moving the housing laterally relative to the plate member to unseat sidewall 54 from recess 36 and then longitudinally moving the housing off the plate member. Housing 20A is the mirror image of housing 20 so that the slot 60 and opening 65 in the housing is exposed from the side of seat assembly 10. This provides access to both couplings to enable removal of the seat back.

It is to be understood that the invention is not limited to the exact construction illustrated and described above, but that various changes and modifications may be made without departing from the spirit and scope of the invention as defined in the following claims.

I claim:
1. A seat assembly comprising:
 a lower seat cushion;
 a seat back extending generally upwardly from said seat cushion, and;
 a coupling for joining said seat back to said seat cushion, said coupling including;
 an elongated mounting plate attached to said seat cushion and extending longitudinally therefrom;
 a hollow housing attached to said seat back, said housing being open at one end for reception of said plate into said housing by longitudinally moving said housing over said plate;
 a recess in one edge of said plate for reception of a longitudinally elongated portion of a sidewall of said housing therein upon lateral movement of said housing relative to said plate to couple said housing to said plate to prevent longitudinal movement of said housing relative to said plate; and
 wedge means comprising a separately attached wedge disposed within said housing for resisting lateral movement of said plate relative to said housing to hold said sidewall in said recess to resist rotational movement of said housing relative to said plate.

2. The coupling of claim 1 wherein a plate edge opposite said recess is inclined so that said plate tapers toward a terminal end of said plate extending from said cushion and said wedge includes a complementary inclined edge for engagement with said plate inclined edge.

3. The coupling of claim 2 wherein said wedge is biased toward said open end of said housing and said wedge further includes stop means for engagement with said housing for retaining said wedge within said housing when said coupling is disassembled.

4. The coupling of claim 2 wherein said recess is formed by a pair of spaced opposing wall portions extending laterally from said plate and said housing sidewall being of a length to be entrapped within said recess with opposite ends of said sidewall engaging said opposing wall portions.

* * * * *